Figure 1:
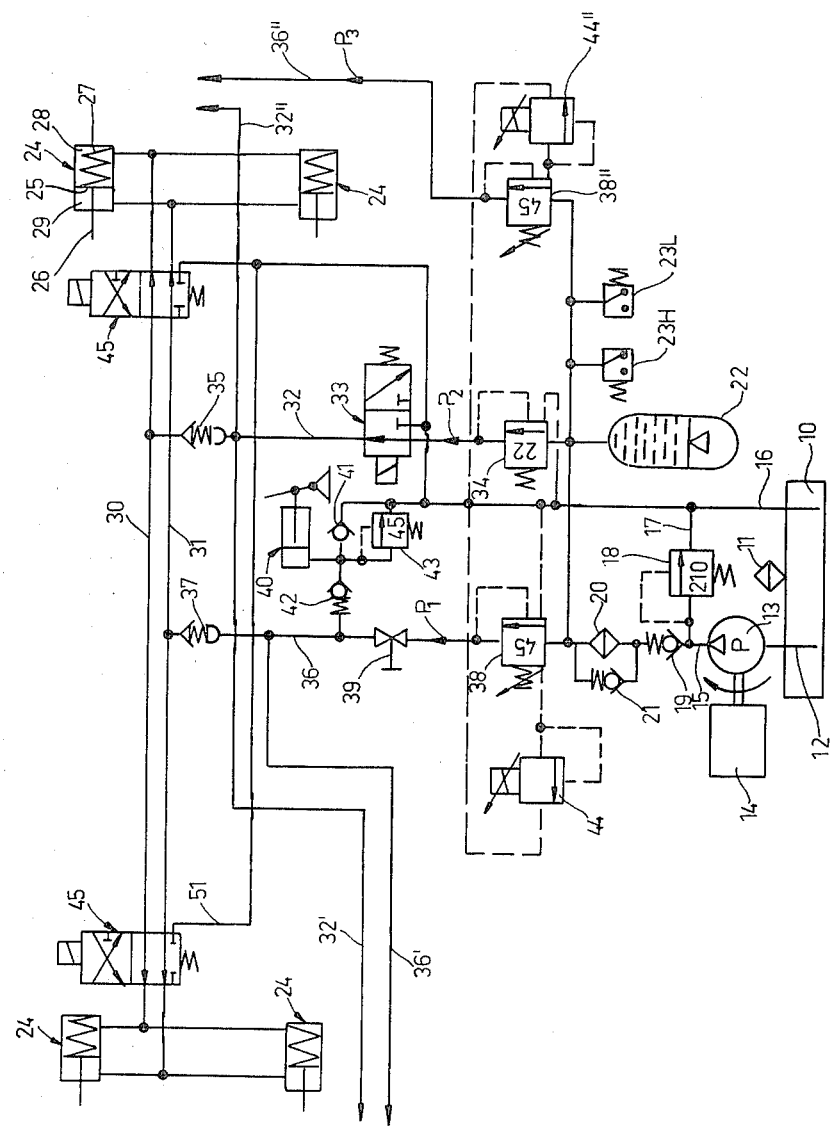

United States Patent [19]
Strom

[11] 4,181,368
[45] Jan. 1, 1980

[54] HYDRAULIC VEHICLE BRAKE SYSTEM

[75] Inventor: Hans-Göran Ström, Lund, Sweden

[73] Assignee: SAB Industri AB, Landskrona, Sweden

[21] Appl. No.: 888,415

[22] Filed: Mar. 20, 1978

[30] Foreign Application Priority Data

Mar. 21, 1977 [SE] Sweden .................. 7703171

[51] Int. Cl.² ............................... B06T 13/70
[52] U.S. Cl. ................................ 303/15; 303/9
[58] Field of Search .............. 188/170; 303/15, 16, 303/3, 13, 22 R, 6 M, 9, 71, 116, 63, 85

[56]        References Cited
    U.S. PATENT DOCUMENTS

| | | | |
|---|---|---|---|
| 3,680,666 | 8/1972 | Sommer | 188/170 |
| 3,724,609 | 4/1973 | Kobald | 188/170 |
| 3,844,625 | 10/1974 | Ingram et al. | 188/170 |
| 3,869,176 | 3/1975 | Kessler et al. | 303/3 |
| 3,944,287 | 3/1976 | Nagase | 303/3 X |
| 3,957,315 | 5/1976 | Cummins et al. | 188/170 |
| 3,999,073 | 12/1976 | Johnson et al. | 188/170 X |
| 4,033,629 | 7/1977 | Spalding | 188/170 X |

*Primary Examiner*—Duane A. Reger
*Attorney, Agent, or Firm*—Laurence R. Brown

[57]        ABSTRACT

A fluid operated braking control system for spring brake cylinders admitting fluid under pressure in both brake applying and brake release directions has a selectively variable pressure from zero to a predetermined maximum applied to overcome the spring and release the brakes and a selectively operable constant pressure fluid applied to aid the spring in the braking direction.

4 Claims, 2 Drawing Figures

4,181,368

HYDRAULIC VEHICLE BRAKE SYSTEM

This invention relates to a hydraulic vehicle brake system comprising at least one hydraulic cylinder operatively connected to a brake rigging and means for controlling the supply of pressurized hydraulic fluid from a source thereof to the hydraulic cylinder.

Three different kinds of brake operations are to be possible with such a system. The first kind is of course normal service braking, which is gradually controlled from very low values up to very high values. The second kind is emergency braking, which shall be performed with as much force as possible and preferably in the absence of any fluid pressure for service braking. The third kind is parking braking, which need not be performed with the same force as the emergency braking but must be possible without any fluid pressure at all present and for an indefinite period of time.

These different requirements are according to the invention fullfilled in that a first pressure reducing valve, controlling the pressure of the fluid supplied to the hydraulic cylinder on the side of its piston which is opposite to the piston side loaded in the brake application direction by means of a compression spring, is operable for supplying pressurized hydraulic fluid of any pressure value between zero and a predetermined maximum value, while a second pressure reducing valve supplying pressurized hydraulic fluid to said cylinder on the spring side of the piston is set to supply hydraulic fluid of a constant pressure valve which is lower than said maximum value.

In other words, the hydraulic cylinder is generally of the spring brake cylinder type, having a strong compression spring acting on the piston in the brake applying direction. The piston is thus acted on in the same direction by the spring and the constant hydraulic pressure and in the opposite direction by the hydraulic pressure variable from zero to a predetermined maximum value. This maximum value is chosen so as to well counteract the force from the spring and the constant pressure and thus to hold the brake inactive or unapplied. The service braking is performed by lowering the variable pressure, the maximum braking force corresponding to emergency braking being obtained at the lowering of the pressure to zero, in which case the brake force is the added force from the spring and the constant pressure. In the absence of any pressure at all, which corresponds to a parking braking, the brakes will be applied by the force from the spring, which thus may be dimensioned for this purpose.

It is to be understood that although this invention is described and claimed as applied to a hydraulic brake system it is equally well applicable with the same advantages to a pneumatic brake system with a spring brake cylinder, it being understood, however, that the control system to be described below is completely different in such a case.

Figure 2:
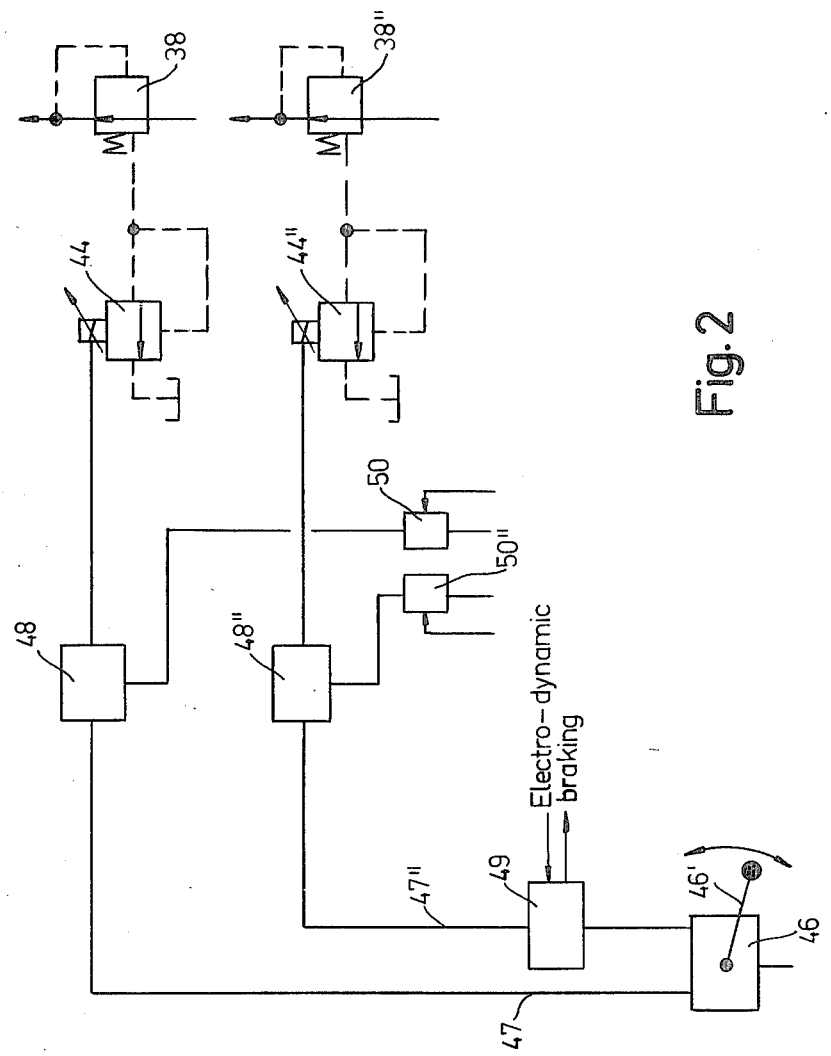
Figure 3:
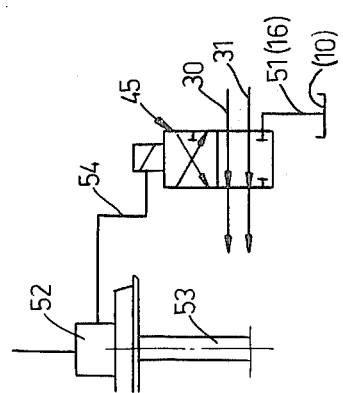

The invention will be described in further detail below reference being made to the accompanying drawings, in which FIG. 1 is a diagram of a hydraulic vehicle brake system according to one embodiment of the invention;

FIG. 2 is a diagram illustrating the incorporation of control means dependent on vehicle weight and dynamic braking in a brake system according to FIG. 1; and FIG. 3 is a fragmentary diagram of anti-skid control means included in the brake system according to FIG. 1.

In FIG. 1 there is disclosed a preferred embodiment of a hydraulic vehicle brake system for a streetcar or tram having a motor bogie and one or more trailing bogies. The principles of the invention are, however, applicable to vehicles with only one or more motor bogies or only one or more trailing bogies. The streetcar or tram may be of the articulated type comprising a motor coach and a trailer coach.

The brake system disclosed in FIG. 1 comprises a reservoir 10 for hydraulic fluid, having a ventilation opening with a filter 11. The suction or input line 12 of a pump 13, which is connected with an electric drive motor 14, is connected to the reservoir, and between the pressure or output line 15 of the pump and a return line 16 also connected to the reservoir 10 there is provided an over-flow connection 17, having a relief valve 18 therein, which is normally closed and opens at a pressure of for example 210 kgs/cm$^2$, defining the allowed maximum pressure in the hydraulic system. The valve 18 thus functions as a safety valve.

In the pressure line 15 there is provided a check valve 19 preventing back-flow in the pressure line, and a filter 20 which is by-passed by a check valve 21 opening at an elevated pressure over the filter in case it should be clogged. Downstream of the filter 20 there is connected to the pressure line 15 an accumulator or pressure fluid reservoir 22 for storing hydraulic fluid under pressure. This accumulator can be of any known type, e.g. of the type wherein the fluid is received by a resilient container which is expanded against the pressure of a confined air volume or other yieldable load when it is filled with pressurized fluid. In a practical embodiment the accumulator 22 has a volume of 10 liters and a maximum operating pressure of 200 kgs/cm$^2$. There are also connected to the pressure line 15 in parallel with the accumulator 22 two pressure responsive switches, a minimum pressure switch 23L and a maximum pressure switch 23H. These switches are connected to the electric control system (not shown) of the motor 14 driving the pump 13 to control its intermittent operation. Thus, the pressure switch 23L is adjusted to switch on the motor 14 at a miniumum pressure of e.g. 70 kgs/cm$^2$, and the pressure switch 23H is adjusted to switch off the motor 14 at a maximum pressure of e.g. 200 kgs/cm$^2$. Accordingly, the pressure of the fluid stored in the accumulator 22 will be maintained between the limits defined by the operating pressures of the switches 23L and 23H.

In FIG. 1 there are shown four hydraulic brake cylinders 24, which are intended for coaction with two wheel sets of a trailing bogie (not shown), although only one cylinder may be used for each wheel set. These cylinders are of the inverse type, i.e. they are spring biased in direction for applying a brake rigging associated therewith. Each cylinder has a piston 25 having a piston rod 26, and a compression spring 27 acting on the side of the piston which is opposite to the piston rod. Cylinder spaces 28 and 29 on the spring side and the piston rod side of the piston 25, respectively, are each connected to a pressure line 30 and 31, respectively. The cylinders 24 can include slack adjusters or not and can be of any known type. They can be connected to brake riggings of any known type.

The line 30 is connected to a pressure line 32 extended from the pressure line 15 and the accumulator 22 and including a valve 33, the function of which will be described later. For the time being it is assumed that the valve 33 provides a straight-through connection in the line 32 as indicated by the valve symbol in FIG. 1. There is also provided in the pressure line 32 a pressure reducing valve 34 which limits the pressure of hydraulic fluid supplied to the line 30 through the line 32 to a predetermined value, e.g. 22 kgs/cm$^2$. Finally, there is included, as a safety measure, in the line 32 a hose breakdown valve 35, which closes in order to cut off the supply of pressurized fluid through the line 32 from the part of the hydraulic system usually mounted in the vehicle body from the rest of said system, which is mounted on the bogie, in case the hose connection commonly provided between said parts in order to allow movements of the bogie in relation to the body should break, come off or burst.

The line 31 is connected to a line 36 extended from the pressure line 15 and the accumulator 22 and including a hose breakdown valve 37 for the purpose mentioned above a pressure reducing valve 38. Said latter valve is of the type that can be adjusted for supplying hydraulic fluid of any pressure between zero and a maximum pressure which is higher than that of fluid supplied to the line 32, e.g. 45 kgs/cm$^2$. In the line 36 there is also provided a manually operated shut-off valve 39, which is normally in an opened position.

A manually operated pump 40 of the reciprocating piston type having an inlet check valve 41 and an outlet check valve 42 is connected between the pressure line 36 downstream of the shut-off valve 39 and the return line 16. Between the pump 40 and the return line 16 there is provided a relief valve 43, which opens at a predetermined maximum pressure to provide a passage from the pump 40 to the return line 16 by-passing the check valve 41. This valve 43 should open at a pressure which equals the maximum pressure of the valve 38.

A solenoid operated control valve 44 is connected to the pressure reducing valve 38 for adjusting hydraulically the pressure defined by said latter valve, the hydraulic fluid control line being indicated by dash lines. As will be described, the solenoid of this control valve is connected to a manually operated control member at the driver's place in the vehicle. By means of the control valve 44 the pressure of the hydraulic fluid supplied from the pressure line 15 through the valve 38 to the line 36 can be adjusted between the limits mentioned above, i.e. between zero and the maximum value for which the valve 38 has been set; in the present case the pressure ranges from 0 to 45 kgs/cm$^2$.

In the lines 30 and 31 there are provided for each pair of hydraulic cylinders 24 a valve 45, which forms part of an anti-skid arrangement, which will be described later. For the time being it is assumed that said valves connect the lines 30 and 31 with the cylinder spaces 28 and 29, respectively, as indicated by the valve symbols in FIG. 1.

Moreover, it will be seen that there are branched from the lines 32 and 36 two lines 32' and 36', which are extended from the system described to one or more further trailing bogies on the vehicle for connection to the hydraulic brake cylinders thereof in the manner described above with reference to the hydraulic cylinders 24 of a single trailing bogie. There is also branched from the line 32 a further 32" and from the pressure line 15 a further line 36" which extend to a motor-driven bogie of the vehicle for connection to hydraulic brake cylinders on said bogie in the manner described. In the line 36" there is provided a pressure reducing valve 38" with a solenoid operated control valve 44" for controlling the pressure in the line 36" in the same manner as described with reference to the line 36.

The operation of the brake system disclosed in FIG. 1 will now be described for different situations that can arise during the operation of a streetcar, tram or other vehicle provided with said brake system. For this purpose it is assumed that the valve 33 and the valves 45 have the positions indicated by the valve symbols disclosed in FIG. 1, as was also assumed above, and that the hydraulic pressure in the line 36 is $P_1$, in the line 32 $P_2$ and in the line 36" $P_3$, as indicated in FIG. 1. Initially, it is also assumed that the shut-off valve 39 is opened.

When the car is connected to the power supply, the pump 13 is intermittently driven by the motor 14 controlled by the pressure responsive switches 23L and 23H in order to supply pressurized hydraulic fluid to the accumulator 22. Thus, the motor 14 will be started in dependence on the swith 23L when the fluid pressure in the accumulator 22 has decreased to the predetermined minimum value. The motor 14 and thus the pump 13 will be kept running until the fluid pressure in the accumulator 22 has increased to the predetermined maximum value. At that moment the switch 23H will shut off the motor 14. It may be assumed in this case that the pressure of the fluid stored in the accumulator 22 will be maintained between 70 and 200 kgs/cm$^2$. The relief valve 18 opens in order to connect the pressure line 15 directly to the return line 16 and thus to the reservoir 10 at a safe maximum pressure value if the motor 14, due to failure of the pressure control system, should continue to operate the pump 13, although the predetermined maximum pressure defined by the switch 23H has been reached.

In order to disengage the brakes it is necessary to supply to the space 29 of the cylinder 24 a hydraulic pressure $P_1$, which will overcome the combined force provided by the hydraulic pressure $P_2$ in the cylinder space 28 as supplied through the valve 34 and the force provided by the spring 27. This is done by increasing the hydraulic pressure $P_1$ in the line 36 by means of the control valve 44 which is operatively connected to the valve 38 governing the pressure of the hydraulic fluid in the line 36. Thus, for disengagement of the brake $P_1 \cdot a_1 > P_2 \cdot a_2 + S$, where $a_1$ is the piston area on the piston rod side, $a_2$ is the piston area on the spring side, and S is the force provided by the spring 27. For service braking control the valve 44 is operated in order to decrease the pressure $P_1$ in the line 36 to a value corresponding to the braking effect desired. When the pressure $P_1$ is zero, the brakes are fully applied and the hydraulic braking force has its maximum value $P_2 \cdot a_2 + S$.

As will be realized, emergency braking is obtained by suddenly decreasing the pressure $P_1$ in the line 36 to zero.

The accumulator 22 shall have a capacity (volume) which allows the vehicle to be fully braked several times, e.g. three times, between the maximum pressure value of the accumulator 22 and the minimum pressure value thereof as defined by the switches 23L and 23H. This means that three full service or emergency braking operations can be performed by utilizing pressurized fluid in the fully loaded accumulator 22 before the pump 13 is started for reloading the accumulator. It may then be possible to make two further full service or emergency braking operations by utilizing the pressurized fluid left in the accumulator 22, if the pressure therein decreases below the minimum pressure value determined by the switch 23L. Thereafter still one further brake application (but no brake release) may be possible.

When the vehicle has to be parked, the pressure $P_1$ is decreased again to zero, and the brakes are applied by the force obtained by the spring 27 only in case the fluid pressure in the accumulator 22 has decreased to zero, as may be the case if the vehicle is disconnected from the power supply. The braking force obtained by the spring 27 should be sufficient to keep the vehicle stationary when parked. If pressurized fluid is available in the accumulator 22 through the line 32 this will, of course, assist the spring 27 when the brakes are applied for parking. However, when the vehicle is disconnected from the power supply, as it usually is when it is left parked, the valve 33 is switched from the position shown in FIG. 1 in which it is held by the solenoid thereof being energized, to its other position wherein line 30 and thus the cylinder space 28 is connected to the reservoir 10 through the line 32 and the return line 16. Thus, for disengaging the brakes of the parked vehicle only the force provided by the spring 27 has to be overcome by pressure supplied to the space 29 of the hydraulic brake cylinder 24. When the vehicle shall be put in service after parking, the necessary hydraulic pressure in the space 29 is supplied to said space independently of the power supply and independently of the accumulator 22 by means of the manually operated pump 40. Before operating said pump, the valve 39 is brought to its closed position. Then, when the pump is operated, pressurized fluid is supplied to the line 36 and thus to the space 29 of each cylinder 24. The valve 43 prevents that the hydraulic pressure produced by manual operation of the hydraulic brake system is increased over the prescribed operating values.

Commonly streetcars and trams are braked not only by applying mechanical brake blocks or pads on the wheels or discs but also electro-dynamically, e.g. by progressively short-circuiting the electric drive motors through a variable resistor system. This electro-dynamic braking, which takes place on the motor bogie, is the main braking, and the mechanical braking should be super-posed to the electro-dynamic braking. In order to prevent the combined braking effect from being too strong it is necessary to adjust the engagement of the mechanical brakes with consideration of the electro-dynamic braking. Automatic means for such adjustment are shown in FIG. 2 of the drawings.

Referring to FIG. 2 the pressure reducing valves 38 and 38" and their solenoid operated control valves 44 and 44" respectively, described with reference to FIG. 1, are shown therein. There is also shown a driver's brake control or "valve" 46, which is operated by the driver and which is connected to an electric control current supply. This control 46 can consist of a variable resistor, transformer or other suitable control means, such as a pulse transmitter, and is adapted to produce control signals the character of which is dependent on the position of the operating handle 46' of the control "valve". It is connected by conduits 47 and 47" to the solenoids of the valves 44 and 44", respectively. In each of said conduits there is provided an electric amplifier 48 and 48", respectively, and in the conduit 47" there is also provided a blending box 49.

The blending box 49 comprises a difference amplifier to which are supplied as input signals a signal which represents the total braking force ordered by the actual setting of the handle 46', and another signal which represents the braking force obtained by electro-dynamic braking of the motor bogie. The difference amplifier produces an output signal according to the chosen characteristics of the amplifier, which is supplied to the control valve 44" so that this valve is adjusted to a position which gives a proper hydraulic braking force in addition to the prevailing electro-dynamic braking effect.

As in most cases it is desired to adjust the braking to the load of the vehicle and more particularly to the load of the individual bogies, the braking signals supplied by means of the control 46 must be modified not only with due consideration of the electro-dynamic braking effect as described with reference to the motor bogie but also with due consideration of the prevailing load, which is true for all bogies of the car.

For this purpose there may be provided two load sensors 50 and 50", which are mounted to sense the load on the trailing bogie and the motor bogie, respectively, and may comprise wire strain gauges or other load pressure transducers. The sensors are connected one to each amplifier 48 and 48", respectively, to supply a signal to the associated amplifier, which controls the gain of the amplifier in such a manner that a signal corresponding to heavy load provides a higher gain than a signal corresponding to light load. Thus, the signals supplied from the control 46 to the control valves 44 and 44" will be modified in the associated amplifier 48 and 48", respectively, such that the braking force applied by means of the hydraulic brake system will be dependent on the load and the load distribution on the vehicle.

If the wheel sets are too heavily braked, they may be locked and then will skid on the rails. If this happens, the circular surface of the wheels running on the rails will expose flat surfaces, so-called "plates", which cause discomfort during riding in the vehicle when the wheels are free to rotate again. In order to prevent locking of the wheel sets and to avoid the drawbacks associated therewith there may be provided in the brake system described an anti-skid arrangement comprising the valves 45 mentioned above.

Referring to FIG. 3, each valve 45 is a three-way solenoid valve having two positions: a first position shown in FIGS. 1 and 3 obtained when the solenoid of the valve is de-energized, and a second position obtained when the solenoid is energized. In said first position there is a straight-through connection between the lines 30 and 31 and the spaces 28 and 29, respectively, of the cylinders 24, and in said second position the line 30 is connected to the space 29 and the line 31 is blocked while the space 28 is connected to the reservoir 10 through a line 31 extending to the return line 16. The energization of the solenoid of each valve 45 is controlled by a sensor 52, FIG. 3, which senses the rotation of an associated wheel set 53 and is connected by a conduit 54 to the solenoid of the associated valve 45. When the sensor 52 senses a rotational speed of the set 53, which is below a predetermined minimum value, it will supply to the solenoid of the associated valve a signal switching the valve to said second position. Thus, it will be seen that no hydraulic pressure will be obtained in the space 28 and that the force provided by the spring 27 will be opposed by the lower hydraulic pressure determined by the valve 34 now supplied to the space 29. The cylinder will operate the associated brake rigging in direction to decrease the braking action, thus allowing the set 53 to rotate and inhibiting locking of the set due to the braking action. When the set has gained speed, the valve 45 will be re-set to said first position in dependence on the sensor 51.

I claim:

1. In a fluid operated vehicle brake system comprising at least one piston-cylinder array with a spring biasing the piston in a brake application direction operatively connected by a fluid circuit array to a brake rigging, first means for controlling the supply of pressurized fluid from a source to operate said array for braking characterized in that the cylinder has fluid chambers for receiving fluid from said source on opposite sides of the piston for applying the piston in either brake application or brake release directions, second means for suppling pressurized fluid from said supply selectively at any pressure between zero and a predetermined maximum pressure in the brake release direction, and third means for suppling pressurized fluid from said supply selectively at a constant pressure lower than said maximum pressure in the brake application direction so that in an emergency braking situation the supplied constant fluid pressure of the third means in the braking direction is immediately effective as the fluid pressure of the second means is rapidly decreasing toward zero and in the normal braking situation the fluid pressure of the second means applied in the brake release direction is variably reduced below the sum of the constant force of the spring bias and the constant fluid pressure of the third means, said first means comprising said second and third means.

2. First means as defined in claim 1 including manual control means comprising a fluid pump and valve arrangement coupled in said fluid conduit system for supplying fluid under pressure to the side of the piston opposite the spring to release the brakes against spring pressure.

3. First means as defined in claim 1 coupled to a vehicle wherein a wheel that is braked by said system rotates, including means sensing the rotational speed of the wheel, and control means reducing the braking force by controlling fluid under pressure to the piston when the wheel rotation speed is below a threshold value.

4. First means as defined in claim 1 including a second braking system operable on said vehicle, and means controlling the fluid pressure by said first means as a proportional function of the braking force supplied by said second braking system.

* * * * *